US007002127B2

(12) United States Patent
Billman

(10) Patent No.: US 7,002,127 B2
(45) Date of Patent: Feb. 21, 2006

(54) METHOD AND SYSTEM FOR WAVEFRONT COMPENSATION

(76) Inventor: Kenneth William Billman, 1942 Limetree La., Mountain View, CA (US) 94040

( * ) Notice: Subject to any disclaimer, the term of this patent is extended or adjusted under 35 U.S.C. 154(b) by 269 days.

(21) Appl. No.: 10/611,802

(22) Filed: Jun. 30, 2003

(65) Prior Publication Data

US 2004/0069927 A1 Apr. 15, 2004

Related U.S. Application Data

(60) Provisional application No. 60/396,736, filed on Jul. 19, 2002.

(51) Int. Cl.
*G02B 27/00* (2006.01)

(52) U.S. Cl. ............... 250/201.9; 359/338; 398/122
(58) Field of Classification Search ............. 250/201.1, 250/201.9; 356/121; 359/337.5–339; 398/122–123, 398/129, 131, 156

See application file for complete search history.

(56) References Cited

U.S. PATENT DOCUMENTS

| 2003/0062464 | A1 * | 4/2003 | Byren et al. | 250/201.9 |
| 2003/0067657 | A1 * | 4/2003 | Dimmler et al. | 359/159 |
| 2003/0206350 | A1 * | 11/2003 | Byren et al. | 359/613 |
| 2004/0075884 | A1 * | 4/2004 | Byren et al. | 359/333 |

* cited by examiner

*Primary Examiner*—Stephone B. Allen

(57) ABSTRACT

Techniques for predicting and correcting for optical distortions. A method for correcting optical distortions in a laser system includes operating a laser system at a first time to emit a laser beam. The laser system includes a laser source, a beam transfer assembly, and a lens assembly. The laser beam is capable of traversing from the laser source, through the beam transfer assembly and the lens assembly, to a laser target. Additionally, the method includes retrieving a first correction setting from a memory system. The first correction setting corresponds to the first time. Moreover the method includes adjusting at least one of the beam transfer assembly and the lens assembly in response to the first correction setting and sending the laser beam through the beam transfer assembly and the lens assembly to the laser target.

32 Claims, 12 Drawing Sheets

METHOD AND SYSTEM FOR WAVEFRONT COMPENSATION

CROSS-REFERENCES TO RELATED APPLICATIONS

This application claims priority to U.S. Provisional No. 60/396,736 filed Jul. 19, 2002, which is incorporated by reference herein.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates generally to the field of optics. More particularly, the invention provides a method and system for predicting and correcting optical distortions. Merely by way of example, the system has been applied in a laser system, but it would be recognized that the invention has a much broader range of applicability. It would be recognized that the invention can be applied to other optical applications that may have disturbances from thermal influences.

Laser systems have been widely used for sending high energy electromagnetic radiation as a beam of a single wavelength from a source to a target. The laser beam carries signals, energy, or both. Laser systems have been employed in applications such as medical, industrial, and defense. Medical applications include selectively removing diseased tumors from human bodies. Industrial applications include metal fabrication and other ways of ablating materials. Defense applications have also used laser systems.

As merely an example, such defense applications include use of a high-energy chemical oxygen iodine laser (COIL) carried aboard a large aircraft such as a Boeing 747-400F freighter. The aircraft carrying the high energy laser (called herein "Airborne Laser") is capable of autonomous operation at altitudes above the clouds. The Airborne Laser is designed to locate and track objects such as missiles in certain phases of their flight. The Airborne Laser accurately points and fires the high-energy laser to the missiles, which destroy the missiles near their launch areas. Other descriptions of the Airborn Laser can be found at http://www.airbornelaser.com.

Although the Airborne Laser has been highly successful, it is desirable to further improve the Airborne Laser or other laser systems. When the laser beam travels from the source to the target, the laser beam could become distorted by certain disturbances. Such disturbance can come from various sources, such as a change of atmospheric index of refraction over the optical path of the beam. This is commonly called optical turbulence. Additionally, disturbances often come from the laser systems themselves, such as distortions in the optical systems due to heating of the optical components by the passage of the laser transmission. Turbulences must be compensated for, and also local optical distortions in order to improve the quality of the laser beam transmission.

To compensate for such disturbances and turbulences, certain characteristics of these must be determined. Using the Airborne Laser System as an example, the laser guidestar technology could be used. Two laser guidestar technologies are the Rayleigh beacon method and the mesosphere beacon method. In both methods, a laser system focuses a beacon laser beam in the outgoing direction of the beacon laser beam. The Rayleigh beacon method usually focuses the beacon laser beam at about 15 to 25 kilometers away from the laser system; while the mesosphere beacon method focuses the laser beam at the mesosphere, which is about 92 kilometers away from the sea level. In either method, the light returning from the focus of the beacon laser beam serves as a wavefront source for sampling turbulences along the path between the focus and the laser transmitter such as the Airborne Laser Aircraft. The sampled turbulences distort the wavefront of backscattered signals. This distortion is usually analyzed by a wavefront sensor and then reconstructed by computer. Then the conjugate of the reconstructed distortion is placed on the outgoing laser beam. By this careful pre-distortion of the transmitted beam, the distortion along the path just refocuses the beam on the target.

FIG. 1 illustrates a simplified process for estimating distortion and correcting laser beam. This figure is merely an illustration. Aircraft 110 flies over clouds 120. Clouds 120 usually top at about 38,500 feet above sea level, and aircraft 110 usually flies at about 40,000 to 45,000 feet above the sea level. Aircraft 110 is equipped with laser system 130. The laser system 130 sends a track laser beam 140 to lock onto nose 150 of missile 160. Subsequently, laser system 130 sends a beacon laser beam 170 to area 175 of missile 160 for estimating distortion of laser beam due to various turbulences. Using this return beacon information, the pre-distorted high energy laser beam 180 is sent out along the same path. During the round trip time the missile rises up and the high energy laser beam 180 hits the "sweet spot" desired 190. As noted above and further emphasized here, FIG. 1 is merely an illustration. High energy laser beam 180 is usually emitted after beacon laser beam 170. During the interval, sweet spot 190 may have traveled to the vicinity of the original location of area 175; hence high energy laser beam 180 may take roughly the same orientation as beacon laser beam 170.

FIG. 2 is a simplified diagram for the Airborne Laser system 130. Laser system 130 usually includes nose-mounted turret 210, beam control system 220, and COIL system 230. COIL system 230 provides high energy laser beam 180 for laser system 130. Internal heating of the optics by laser system 130 may distort laser beams 140, 170, and 180 due to aberrations produced within the system. These aberrations may occur to various components of the system, including conformal window of nose-mounted turret 210 and its boundary layer, the optical system of nose-mounted turret 210, and other optical components along the optical path of the laser beams. To improve performance of the laser beams, the wavefront distortions need to be corrected.

Hence it is desirable to improve wavefront compensation techniques.

BRIEF SUMMARY OF THE INVENTION

According to the present invention, techniques for optical prediction and correction are provided. More particularly, the invention provides a method and system for predicting and correcting optical distortions. Merely by way of example, the system has been applied in a laser system, but it would be recognized that the invention has a much broader range of applicability. It would be recognized that the invention can be applied to other optical applications that may have disturbances from thermal influences.

According to a specific embodiment of the present invention, a method for processing optical signals to correct for optical distortions is provided. The method includes providing a laser system. The laser system has at least an energy source and an optical system. The optical system is configured to direct an energy beam from the energy source to a target object. Additionally, the method includes maintaining the laser system in a first measurement condition, orienting a first measurement laser beam at a first measurement angle, and sending the first measurement laser beam to a first measurement focal point at a first measurement time. Moreover, the method includes receiving a first measurement return signal in response to the first measurement laser beam, adjusting the laser system to a first measurement setting in response to the first measurement return signal, storing the first measurement setting and the first measurement time, and determining whether to send a second measurement laser beam to a second measurement focal point at a second measurement time. The above processes of the providing, the maintaining, the orienting, the sending, the receiving, the adjusting, the storing, and the determining are performed free from an engagement between the laser system and a laser target.

In another embodiment, a method for predicting optical distortions includes sending a first measurement laser beam to a first measurement focal point at a first measurement time, receiving a first measurement return signal in response to the first measurement laser beam, and adjusting a laser system to a first measurement setting in response to the first measurement return signal. The above processes of the sending, the receiving, and the adjusting are free from an engagement between the laser system and a laser target.

In yet another embodiment, a method for correcting optical distortions in a laser system includes operating a laser system at a first time to emit a laser beam. The laser system includes a laser source, a beam transfer assembly, and a lens assembly. The laser beam is capable of traversing from the laser source, through the beam transfer assembly and the lens assembly, to a laser target. Additionally, the method includes retrieving a first correction setting from a memory system corresponding to the first time, adjusting at least one of the beam transfer assembly and the lens assembly in response to the first correction setting, and sending the laser beam through the beam transfer assembly and the lens assembly to the laser target.

In yet another embodiment, a system for processing optical signals to correct for optical distortions includes a laser system, a carrier system carrying at least the laser system, a control system interacting with at least the laser system, and a memory system interacting with at least the control system. The carrier system is configured to maintain the laser system to a first measurement condition. The laser system is configured to orient a first measurement laser beam at a first measurement angle and send the first measurement laser beam to a first measurement focal point at a first measurement time. Additionally, the laser system is configured to receive a first measurement return signal in response to the first measurement laser beam and adjust to a first measurement setting in response to the first measurement return signal. The control system is configured to determine whether to send a second measurement laser beam to a second measurement focal point at a second measurement time and communicate the determination to the laser system. The memory system is configured to store at least the first measurement setting and the first measurement time.

In yet another embodiment, a laser system includes a laser source, an optical system coupled to the laser source, and a database system coupled to the optical system and the laser source. The database system includes a plurality of correction settings and a plurality of correction times corresponding to the plurality of correction settings respectively. The plurality of correction settings are capable of correcting for potential distortions in the optical system at the plurality of correction times respectively.

Numerous benefits are achieved using the invention over conventional techniques. Depending upon the embodiment, one or more of these benefits may be achieved. For example, the present invention frees the beacon laser beam of the laser system for other use during the actual engagement. The present invention reduces use of either the beacon laser beam system or track laser beam system, their cooling systems, and their diode pump lasers, and elongates the service lives of both systems. Additionally, the present invention improves compensation for turbulences and the signal to noise ratio of the wavefront sensor. These and other benefits are described throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for optical prediction and correction are provided. More particularly, the invention provides a method and system for predicting and correcting optical distortions. Merely by way of example, the system has been applied in a laser system, but it would be recognized that the invention has a much broader range of applicability. It would be recognized that the invention can be applied to other optical applications that may have disturbances from thermal influences.

Figure 1:
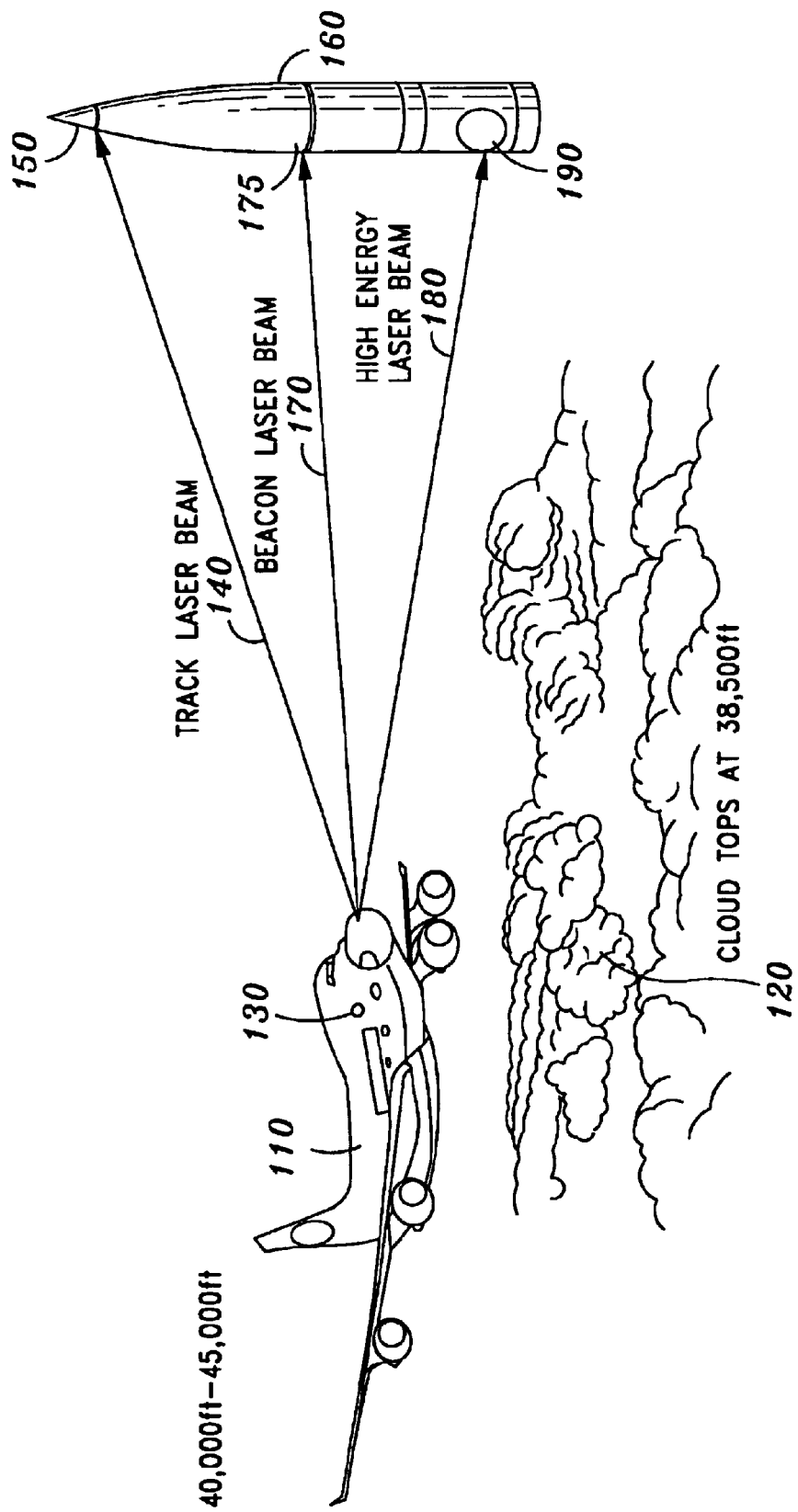
FIG. 1 illustrates a simplified process for estimating distortion and correcting laser beam.
Figure 2:
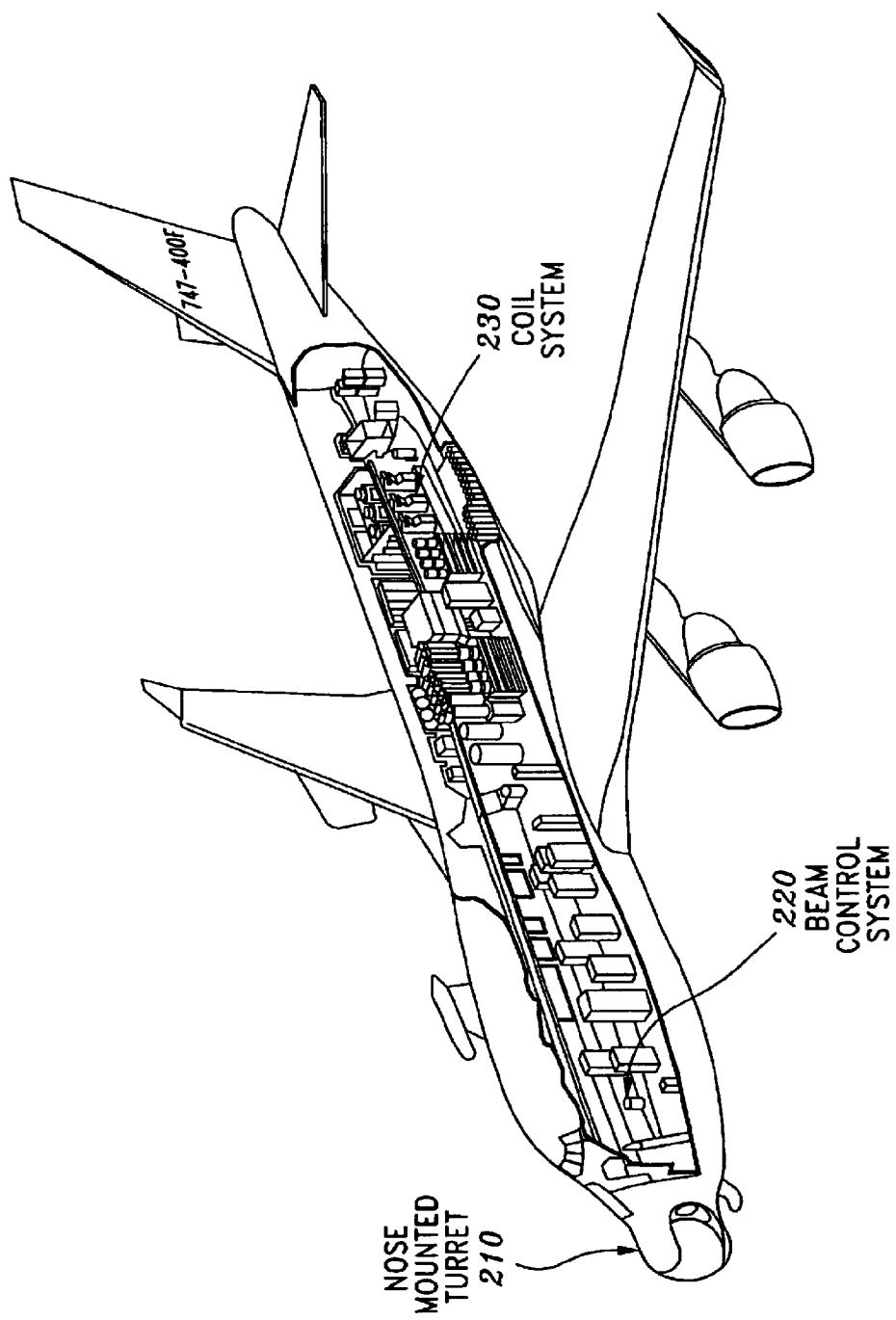
FIG. 2 is a simplified diagram for laser system.

FIGS. 1 and 2 illustrate simplified conventional technique for estimating distortion and correcting laser beam, but the conventional technique has only limited applications. The conventional technique usually applies when missile 160 is in the boost phase and consequently laser beams 140, 170 and 180 travel along a nearly horizontal or slightly elevated path. In contrast, the conventional technique generally does not perform effectively if laser beams travel along a nearly vertical path.

Figure 3:
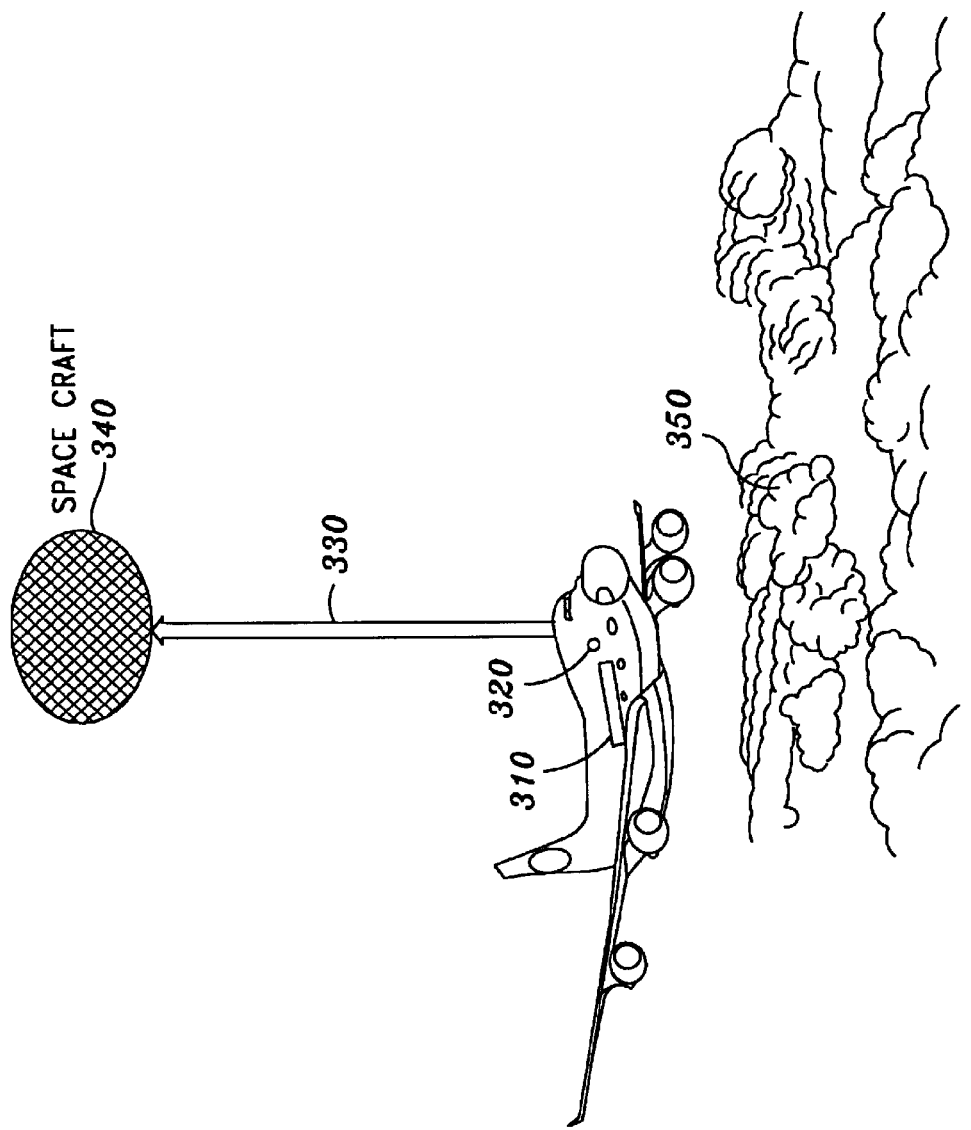
FIG. 3 is a simplified diagram for a laser beam traveling nearly vertically.

FIG. 3 illustrates a simplified diagram for a laser beam traveling nearly vertically. This diagram is merely an example, which should not unduly limit the scope of the claims. One of ordinary skill in the art would recognize many variations, alternatives, and modifications. In FIG. 3, aircraft 310 is equipped with laser system 320. Laser system 320 sends laser beam 330 in order to transmit signals or energy to space craft 340. The laser beam travels from aircraft 310 to spacecraft 340 along a nearly vertical path. For example, aircraft 310 may fly over cloud 350 at about 12.4 kilometers above the sea level. Spacecraft 340 may be located at about 150 to 1500 kilometers from the sea level.

When laser beam 330 travels along a nearly vertical path, the atmospheric density falls exponentially as follows:

$$\text{Density} \propto \exp\left[-\left(\frac{D_{travel}}{D_{critical}}\right)\right] \quad \text{(Equation 1)}$$

where $D_{travel}$ is the distance over which the laser beam travels nearly vertically with increasing altitude. $D_{critical}$ is a constant of approximately 6 kilometers. Under the conventional technique for estimating laser beam distortions, a Rayleigh beacon laser beam 330 is usually focused at about 15 to 25 kilometers above aircraft 310. All along the path to the focus, back-scattered light is produced by the interaction of the outgoing laser beam and the molecules along this path. As the molecules become less dense at higher altitudes, the Rayleigh backscatter decreases. When the Rayleigh beacon laser beam travels almost vertically towards its focal point, the atmospheric density drops drastically as shown in Equation 1. The decrease in atmospheric density reduces magnitude of backscattered signal received by wavefront sensor of laser system 320, and consequently degrades the signal to noise ratio of the wavefront sensor. The reduced signal to noise ratio introduces errors into estimation of turbulences to laser beam 330 and into compensation for such turbulences. To mitigate these errors, the acceptance gate of the beacon camera may be enlarged so that the beacon camera samples a larger portion of the backscattered signal of the beacon laser beam. But enlarging the acceptance gate also introduces another degradation of signal to noise ratio. Namely, the spreading of photons over the elongated focus of the beacon laser beam degrades the accuracy of the wavefront sensor. In addition, enlarging the acceptance gate also allows additional sky background noises into the wavefront sensor and therefore further degrades the signal to noise ratio.

To solve these problems, we have found that a laser beam suffers only low atmospheric turbulences when the laser beam travels nearly vertically. For example, when the laser beam travels in a direction within 40 degrees from the vertical direction, the low atmospheric density usually significantly reduces atmospheric turbulences to the laser beam. Hence the turbulences that distort the laser beam come not from the atmosphere but rather mainly from the laser system. These turbulences can be predicted based on measurements and interpolations as discussed below.

Figure 4:
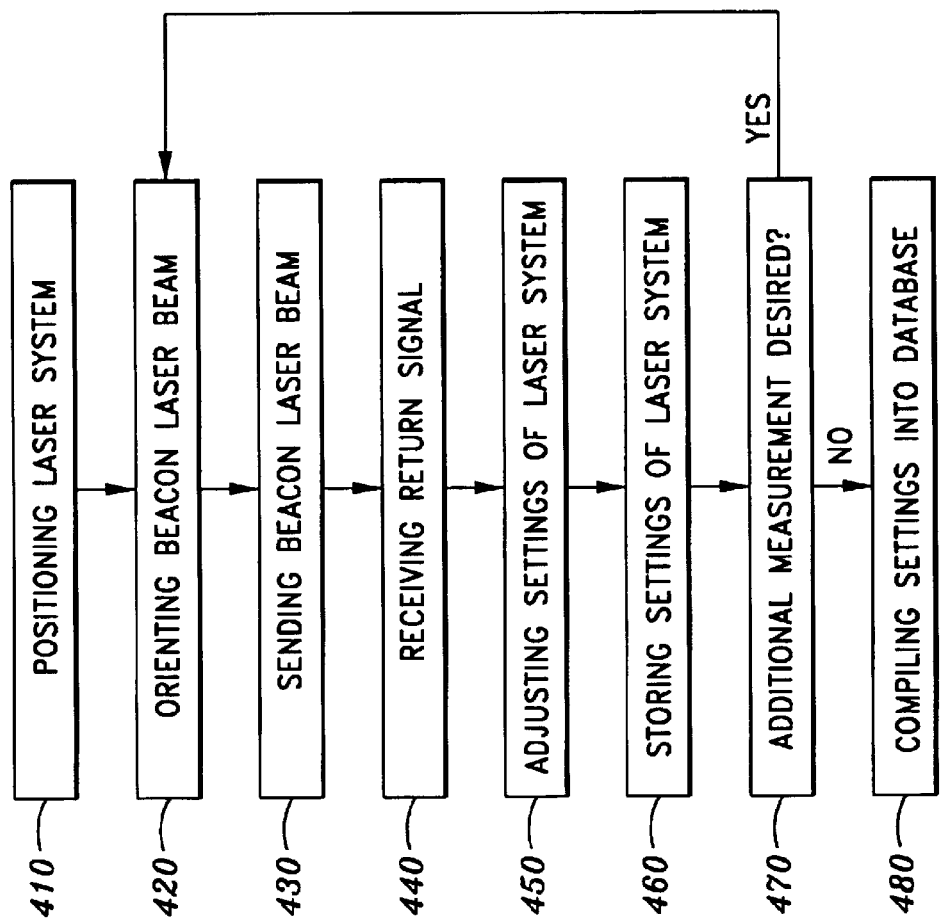
FIG. 4 is a simplified block diagram for creating database for compensating for turbulences according to one embodiment of the present invention.

FIG. 4 is a simplified block diagram for creating database for compensating for turbulences according to one embodiment of the present invention. This diagram is merely an example, which should not unduly limit the scope of the claims. One of ordinary skill in the art would recognize many variations, alternatives, and modifications. The method of creating database for compensating for turbulences includes process 410 of positioning laser system, process 420 for orienting beacon laser beam, process 430 for sending beacon laser beam, process 440 for receiving return signal, process 450 for adjusting setting of laser system, process 460 for storing setting of laser system, process 470 for determining desirability of additional measurement, and process 480 for compiling recorded settings into database. Although the above has been shown using a selected sequence of processes, there can be many alternatives, modifications, and variations. For example, some of the processes may be expanded and/or combined. Process 420 of orienting beacon laser beam and process 430 of sending beacon laser beam may be combined. Process 450 of adjusting setting of laser system and process 460 of storing setting of laser system can be combined. Other processes may be inserted to those noted above. A process of interpolating setting of laser system can be inserted between process 470 of determining desirability of additional measurement and process 480 of compiling settings into database, or inserted after process 480 of compiling settings into database. Depending upon the embodiment, the specific sequence of steps may be interchanged with others replaced. Process 480 of compiling settings into database may be performed prior to process 470 for determining desirability of additional measurement. Further details of these elements are found throughout the present specification and more particularly below.

Figure 5:
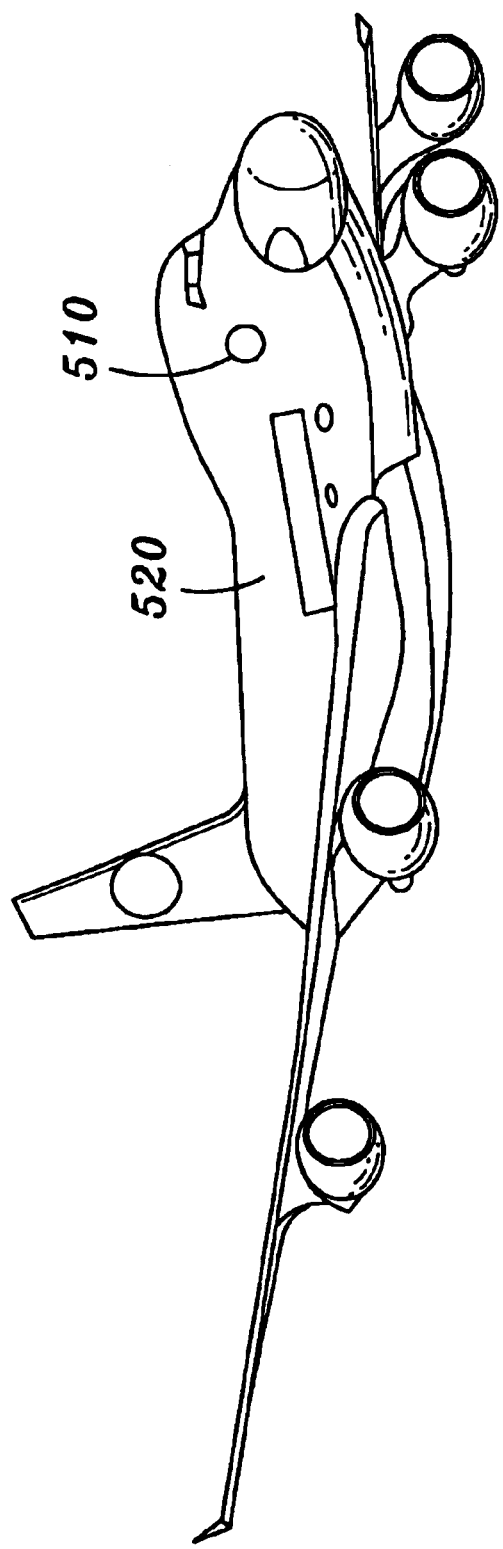
FIG. 5 is a simplified diagram for positioning laser system.

At process 410 for positioning laser system, a laser system is positioned in conditions same as those during actual engagement of the laser system and a laser target. For example, as shown in FIG. 5, laser system 510 may be placed onto aircraft 520. Aircraft 520 flies at the same altitude and speed as those when laser system 510 engages with laser target. Alternatively, aircraft 520 is placed on the ground. In both arrangements, laser system 510 covers the angular range used by the laser system in actual engagement. Laser target 530 may be a spacecraft or other. Laser target 530 may be present or absent at process 410. As discussed above and further emphasized here, FIG. 5 should not unduly limit the scope of the claims. One of ordinary skill in the art would recognize many variations, alternatives, and modifications.

At process 420 for orienting beacon laser beam, the laser system orients a beacon laser beam towards the position the laser target would occupy when the laser beam reaches the laser target during actual engagement. In addition, the beacon laser beam may be of the same type as one that will be used for actual engagement.

Figure 6:
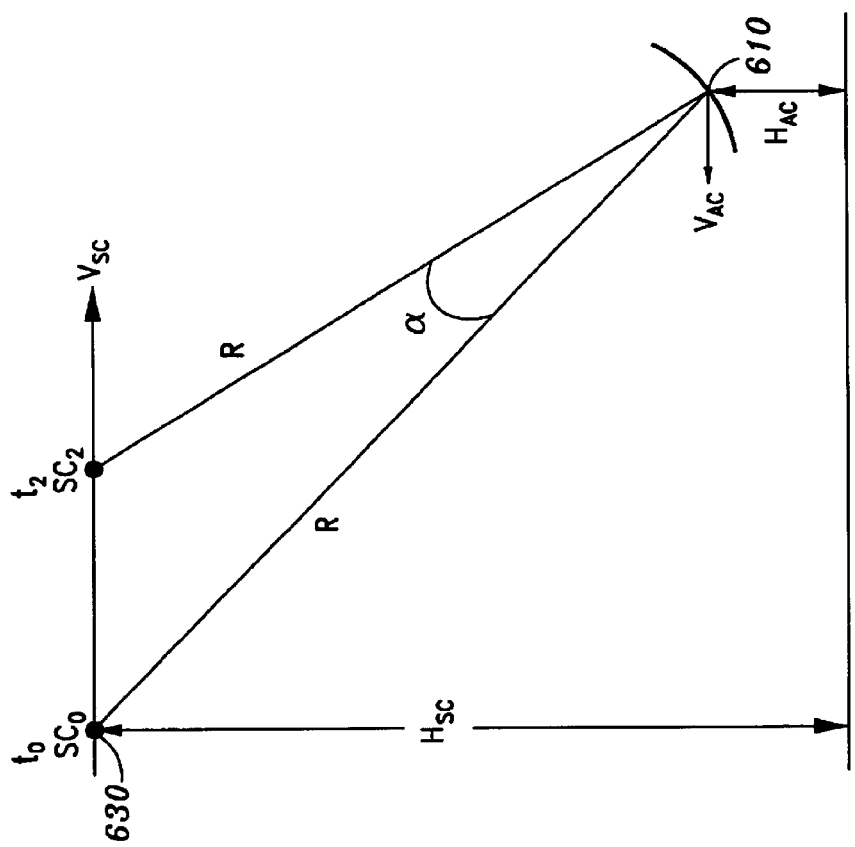
FIG. 6 illustrates a simplified geometry during actual engagement.

FIG. 6 illustrates a simplified geometry during actual engagement. This diagram is merely an example, which should not unduly limit the scope of the claims. One of ordinary skill in the art would recognize many variations, alternatives, and modifications. During actual engagement, laser system 610 has a small velocity $V_{AC}$, such as about 0.2 kilometers per second. In contrast, laser target 630 has a large velocity $V_{SC}$, such as about 7 kilometers per second.

Therefore, the small velocity $V_{AC}$ may be neglected. In addition, laser system 610 may be placed on aircraft or other. Laser target 630 may be a spacecraft or other. As shown in FIG. 6, laser system 610 has a low altitude $H_{AC}$, such as about 12 kilometers; while laser target 630 has a high altitude $H_{SC}$, such as about 100 kilometers to 1500 kilometers. Therefore, the distance between laser system 610 and laser target 630 during actual engagement is significant. To travel from laser system 610 to laser target 630 or vice versa would take a laser beam the following time:

$$T_{travel} = \frac{R}{c} \quad \text{(Equation 2)}$$

where $T_{travel}$, denotes the time it would take for a laser beam to travel from laser system 610 to laser target 630 or vice versa. R is the distance between the position of laser system 610 when the laser beam leaves laser system 610 and the position of laser target 630 when the laser beam arrives at laser target 630, or the distance between the position of laser target 630 when the laser beam leaves laser target 630 and the position of laser system 610 when the laser beam arrives at laser system 610.

During actual engagement, at $t=t_0$, photons representing image of laser target nose 630 leave laser target 630 from its position $SC_0$, as shown in FIG. 6. At $$t_1 = t_0 + \frac{R}{c},$$

laser system 610 receives the photons representing image and uses the image to obtain a track file from which the flight direction of laser target 630 is known. For example, laser target 630 may be a spacecraft orbiting the Earth or other. At each round-trip time step of $2 \times t_1$, the laser beam is pointed at an angle $\alpha$ ahead of the observed position for laser target 630 at $t_0$, where $$\alpha = 2 \times \frac{V_{SC}}{c} \quad \text{(Equation 3)}$$

Consequently, during actual engagement, the laser beam would arrive at laser target 630 at position $SC_2$ at $$t_2 = t_0 + 2 \times \frac{R}{c} \quad \text{(Equation 4)}$$

At process 420 for orienting beacon laser beam, the laser system does not engage any laser target. The angle of beacon laser beam needs to be theoretically calculated at corresponding measurement time as shown in Equation 4. The measurement time measures the time span over which the laser system is turned on when the laser system sends out the beacon laser beam at process 430. The angle of beacon laser beam at any measurement time needs to equal or nearly equal angle of laser beam during actual engagement at an engagement time equal to the measurement time. The engagement time measures the time span over which the laser system is turned on when the laser system sends out the laser beam to engage the laser target. Hence, at process 420 for orienting beacon laser beam, the laser system orients the beacon laser beam, without engaging any laser target, towards the position the laser target would occupy when the laser beam reaches the laser target during actual engagement. To direct the beacon laser beam at a proper angle, the laser system adjusts settings of some of its components, such as the turret assembly, steering mirrors, or combination thereof.

At process 430 for sending beacon laser beam, the laser system sends out a beacon laser beam while focusing the beacon laser beam to a focal point near the laser system. The focusing process may be accomplished by adjusting components of laser system, such as primary-secondary mirrors or beam expander. The close proximity of the focal point of the beacon laser beam usually assures that the beacon laser beam travels through altitudes at which the atmospheric density remains high. The high atmospheric density generally provides strong backscattering of the beacon laser beam and thus strong return signal to the laser system.

At process 440 for receiving return signal, laser system receives the return signal resulting from backscattering of the beacon laser beam.

At process 450 for adjusting setting of laser system, the received return signal is analyzed by the wavefront sensor and subsequently the computer determines actuator positions for deformable mirrors in order to compensate for turbulences experienced by the beacon laser beam.

At process 460 for storing setting of laser system, the actuator positions for deformable mirrors are stored. The storing may be performed manually or automatically. The actuator positions may be stored on various types of media, such as computer hard disk, paper, or combination thereof.

At process 470 for determining desirability of additional measurement, whether additional measurement at a subsequent measurement time should be performed is determined. If the answer is positive, processes 420 through 470 are repeated for a subsequent measurement time. If the answer is negative, process 480 for compiling settings of laser system is performed.

At process 480 for compiling settings of laser system, the recorded settings of the laser system are compiled into a database. The database contains the recorded settings as a function of measurement time. As described above, the measurement time measures the time span over which the laser system is turned on when the corresponding beacon laser beam was sent at process 430. The database may take various forms, such as written document on paper, electronic file on computer, or combination thereof. The database may take various data structures, including lookup table.

Figure 6A:
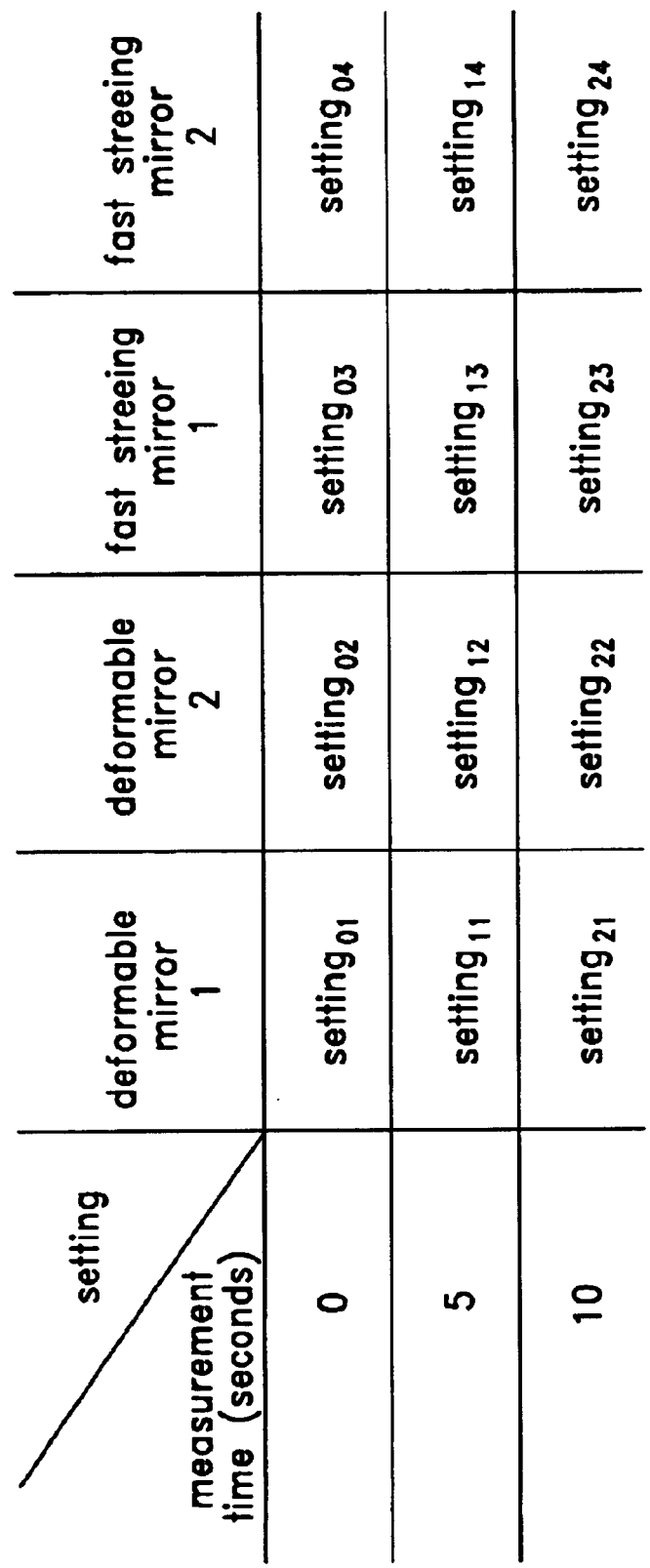
FIG. 6A is a simplified diagram for a database according to one embodiment of the present invention.

FIG. 6A is a simplified diagram for a database according to one embodiment of the present invention. This diagram is merely an example, which should not unduly limit the scope of the claims. One of ordinary skill in the art would recognize many variations, alternatives, and modifications. The database contains settings for deformable mirror 1, deformable mirror 2, fast steering mirror 1, and fast steering mirror 2 at various measurement times, such as 0 second, 5 seconds, and 10 seconds. As noted above and further emphasized here, FIG. 6A is merely an example. Measurement time may start at after or before 0 second, and it may use constant or variable time intervals equal to or different from 5 seconds as illustrated. Additionally, the database may contain settings for less than or more than two deformable mirrors and/or settings for less than or more than two fast steering mirrors. The database may also contain settings for other components of the laser system. Some examples of the deformable mirrors and fast steering mirrors are described in FIG. 9.

In addition, a process of interpolating setting of laser system may be optionally performed. At process of interpolating setting of laser system, setting of the laser system at intermediate time may be interpolated using the recorded settings of the laser system and their corresponding measurement times. The intermediate time lies between two adjacent measurement times; therefore the interpolated setting approximates turbulences to laser beam at a given intermediate time without performing any measurement. The interpolation may be performed before or after process 480 of compiling settings into database. In any event, the interpolated setting and the corresponding intermediate time are incorporated into the database.

Alternatively, the process of interpolating setting of laser system may be performed dynamically during actual engagement. During actual engagement, if the laser system needs to send out a laser beam at an engagement time that does not correspond to any measurement time in the database, setting of the laser system at an intermediate time equal to the engagement time may be dynamically interpolated using the recorded settings of the laser system and their corresponding measurement times in the database. Alternatively, some interpolations of settings of the laser system may be performed during creation of database and other interpolations of settings may be performed dynamically during actual engagement.

Figure 7:
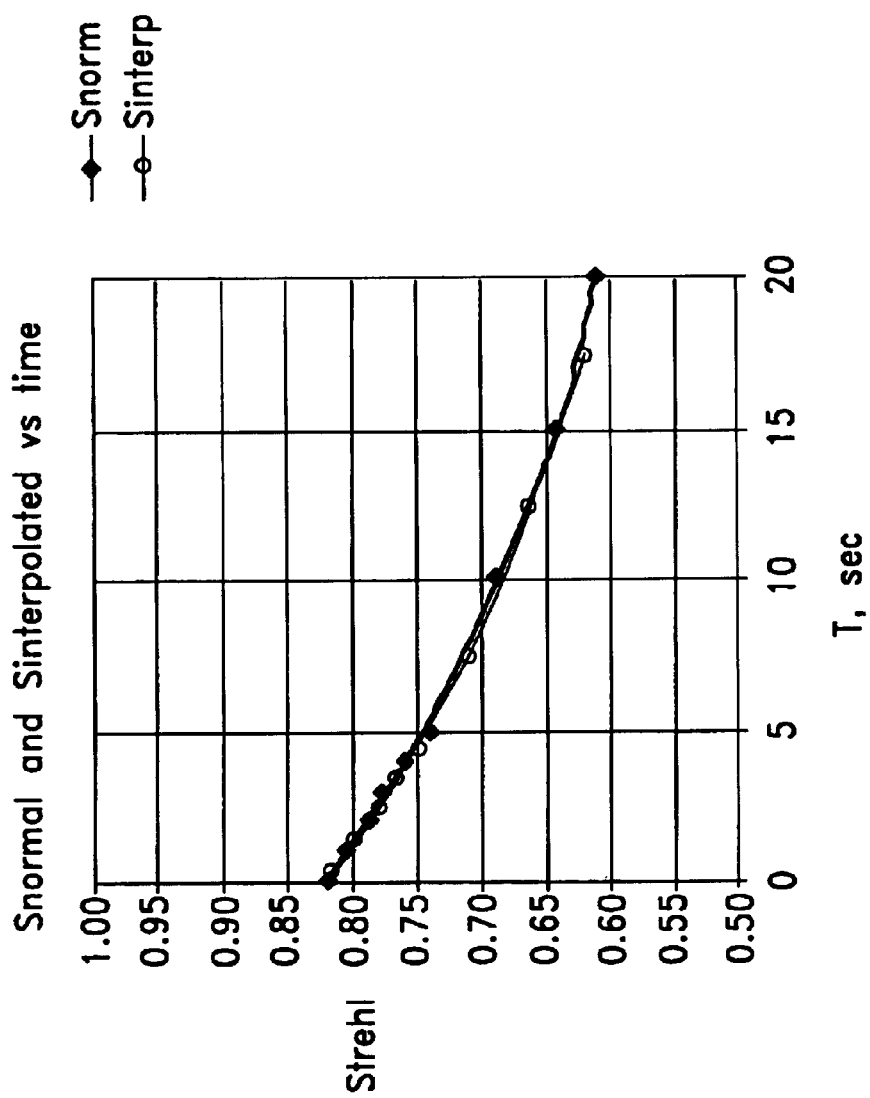
FIG. 7 is a simplified comparison showing effectiveness of interpolated settings of laser system.

FIG. 7 is a simplified comparison showing effectiveness of interpolated settings for laser system. This comparison is merely an example, which should not unduly limit the scope of the claims. Strehl measures ratio of intensity of a laser beam at its central axis without atmospheric disturbance to intensity of the laser beam at its central axis with atmospheric disturbance. The atmospheric disturbance may be corrected by the laser system. For a perfectly calibrated laser system, strehl usually equals 1. As shown in FIG. 7, by simulation, the curve Snorm shows performance of the laser system as a function of engagement time using settings in a lookup table for calibration. Another curve Sinterp shows performance of the laser system as a function of engagement time using settings interpolated from the settings in the lookup table. Sinterp almost overlaps with Snorm; therefore interpolated settings are effective. As noted above and further emphasized here, FIG. 7 is merely an example. The lookup table used may not have been optimized to perfectly calibrate the laser system.

In addition, accuracy of the database for compensating for turbulences may be improved according to yet another embodiment of the present invention. The improvement may be accomplished by process of updating database. The process of updating database may be performed immediately before actual engagement. At the process of updating database, the laser system sends a beacon laser beam and focuses the beacon laser beam at a focal point near the laser system. For example, the focal point may be located about five kilometers away from the laser system. The close proximity of the focal point to the laser system usually assures that the beacon laser beam travels through altitudes at which the atmospheric density remains high. High atmospheric density provides strong backscattered signal and consequently high signal to noise ratio for the wavefront sensor of the laser system. When the laser system receives the backscattered signal, setting of the laser system is adjusted. For example, the beam expander of the laser system adjusts distance between primary and secondary mirrors and therefore removes the focus from the return signal. If the control loop of the laser system has a bandwidth of 5 Hz, the adjustment of the setting usually takes only a few tenths of a millisecond. Based on the adjusted setting of the laser system, the recorded settings compiled in the database may be adjusted.

As discussed above, process of updating database may be performed immediately prior to actual engagement but such process may be performed at any time. For example, process of updating database may be performed during engagement if the engagement would not be degraded by a few seconds of interruption. For another example, process of updating database may be performed periodically during engagement.

During engagement, the database is used to adjust the laser system and correct for optical distortions according to an embodiment of the present invention. The laser system usually includes a laser source, a beam transfer assembly, and a lens assembly. The laser. system retrieves a stored setting and a corresponding stored time from the database. The stored setting usually includes a setting for deformable mirrors of the laser system. The stored time measures the operation period of the laser system since the last cooling period. For example, a stored time equal to zero corresponds to the beginning of the operation period of the laser system. After the laser system operates for a period substantially equal to the stored time, the beam transfer assembly, the lens assembly, or both are adjusted in response to the stored setting retrieved. Consequently, the laser system sends the laser beam through the beam transfer assembly and the lens assembly to the laser target. For example, the direction from the laser system to the laser target is substantially vertical to the sea level. The angle between the direction from the laser system to the laser target and the direction vertical to the sea level may range from 0 degree to 40 degrees. The above description is only an example and should not unduly limit the scope of the claims. One of ordinary skill in the art would recognize many variations, alternatives, and modifications.

As discussed above and further emphasized here, the present invention has wide range of applicability. For example, the present invention applies to sending a laser beam from a laser system on a aircraft to a spacecraft. For another example, the present invention applies to using a laser system or other directed energy system to lock onto a spacecraft such as a satellite. The laser system or other directed energy system may have adaptive optics systems. Locking onto the spacecraft enables us to observe the spacecraft with compensated imaging, conduct high-speed communications with the spacecraft using compensated laser beam transmission, provide power to the spacecraft, propel the spacecraft, chemically re-supply the spacecraft, or even destroy the spacecraft with high power laser beam. For yet another example, the present invention applies to sending laser beam to a relay mirror. If the relay mirror comprises a satellite, the laser beam would reflect off the satellite to other targets. Alternatively, the satellite may allow the laser system to look through its reflective optics system and to observe objects at larger range or over the horizon.

Figure 8:
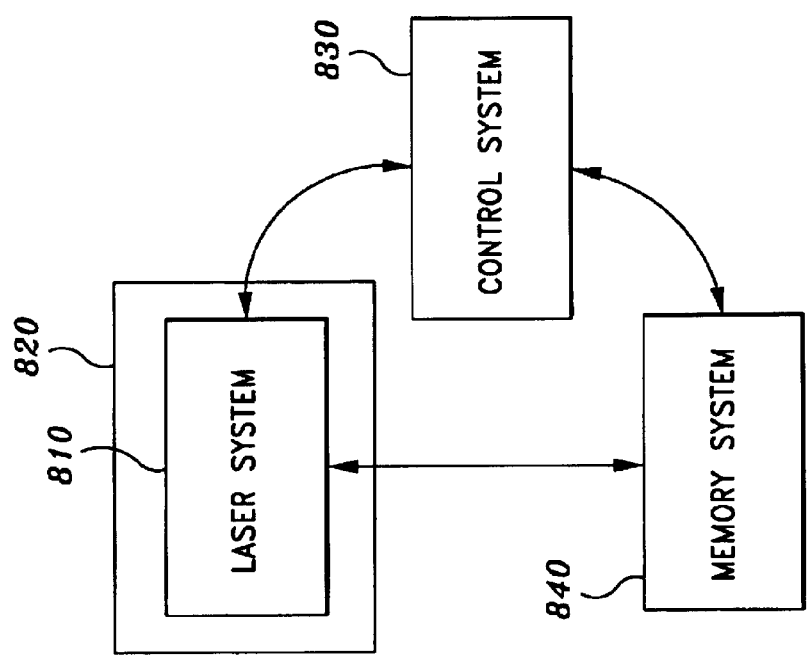
FIG. 8 illustrates a simplified system for creating database for compensating for turbulences according to one embodiment of the present invention.

FIG. 8 illustrates a simplified system for creating database for compensating for turbulences according to one embodiment of the present invention. This diagram is merely an example, which should not unduly limit the scope of the claims. One of ordinary skill in the art would recognize many variations, alternatives, and modifications. System 800 for creating database for compensating for turbulences includes laser system 810, carrier system 820, control system 830, and memory system 840. Although the above has been shown using selected systems 810, 820, 830, and 840, there can be many alternatives, modifications, and variations. For example, some of the systems may be expanded and/or combined. Control system 830 may be combined into laser system 810. Memory system 840 may be combined into laser system 810. Control system 830 and memory system 840 may be combined into a computer server or a personal computer. Laser system 810 may directly store its setting into memory system 840. Other systems may be inserted to those noted above. Further details of these systems are found throughout the present specification and more particularly below.

As shown in FIG. 8, laser system 810 performs process 420 of orienting beacon laser beam, process 430 of sending beacon laser beam, process 440 for receiving return signal, process 450 for adjusting setting of laser system 810 as discussed above. Carrier system 820 positions laser system 810 during process 410 of positioning laser system. Carrier system 820 may be an aircraft or other type of carrier. Control system 830 performs process 460 of storing setting of laser system 810 by storing such setting in memory system 840. In addition, control system 830 performs process 470 of determining additional measurement and process 460 of compiling settings into database. Control system 830 may be located in carrier system 820 or outside carrier system 820. Control system 830 may be connected to laser system 810 locally or remotely. The connection may be through a digital network or a wireless network. Memory system 840 stores setting of laser system at process 460 and stores the database at process 480. Memory system 840 may be connected to control system 830 locally or remotely. The connection may made through a digital network or a wireless network. Memory system 840 may be a computer cache memory, a computer hard disk, a remote memory unit, or other.

Figure 9:
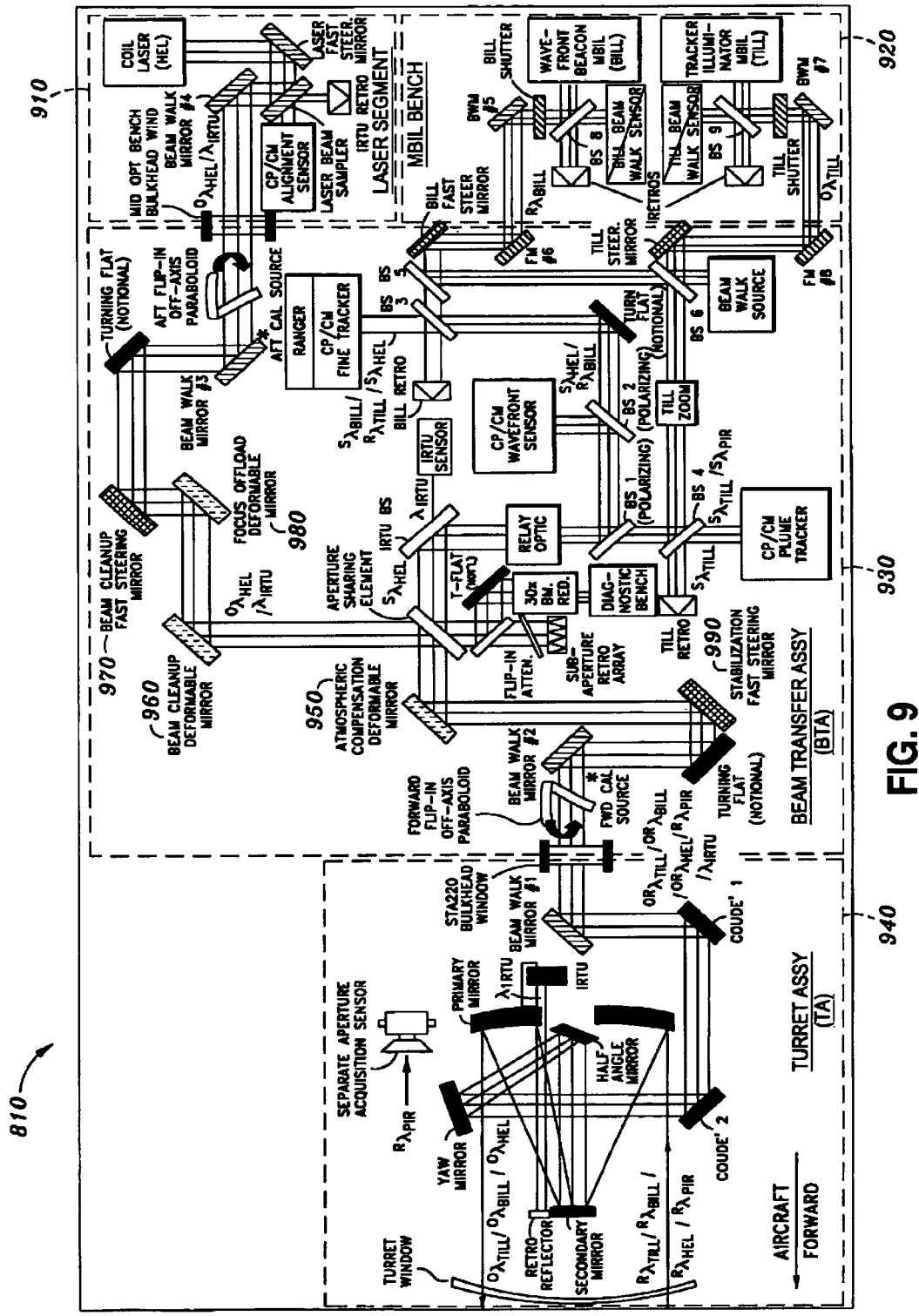
FIG. 9 illustrates a simplified laser system according to one embodiment of the present invention.

FIG. 9 illustrates a simplified laser system according to one embodiment of the present invention. This diagram is merely an example, which should not unduly limit the scope of the claims. One of ordinary skill in the art would recognize many variations, alternatives, and modifications. Laser system 810 includes system 910 of chemical oxygen iodine high energy laser ("COIL HEL"), system 920 of multibeam illuminator ("MBIL") bench, system 930 of beam transfer assembly ("BTA"), and system 940 of turret assembly ("TA"). Laser system 900 may operate in either alignment mode or normal operation mode. As shown in FIG. 9, laser system 900 includes atmospheric compensation deformable mirror 950, beam cleanup deformable mirror 960, beam cleanup fast steering mirror 970, focus offload deformable mirror 980, and stabilization fast steering mirror 990.

Figure 10:
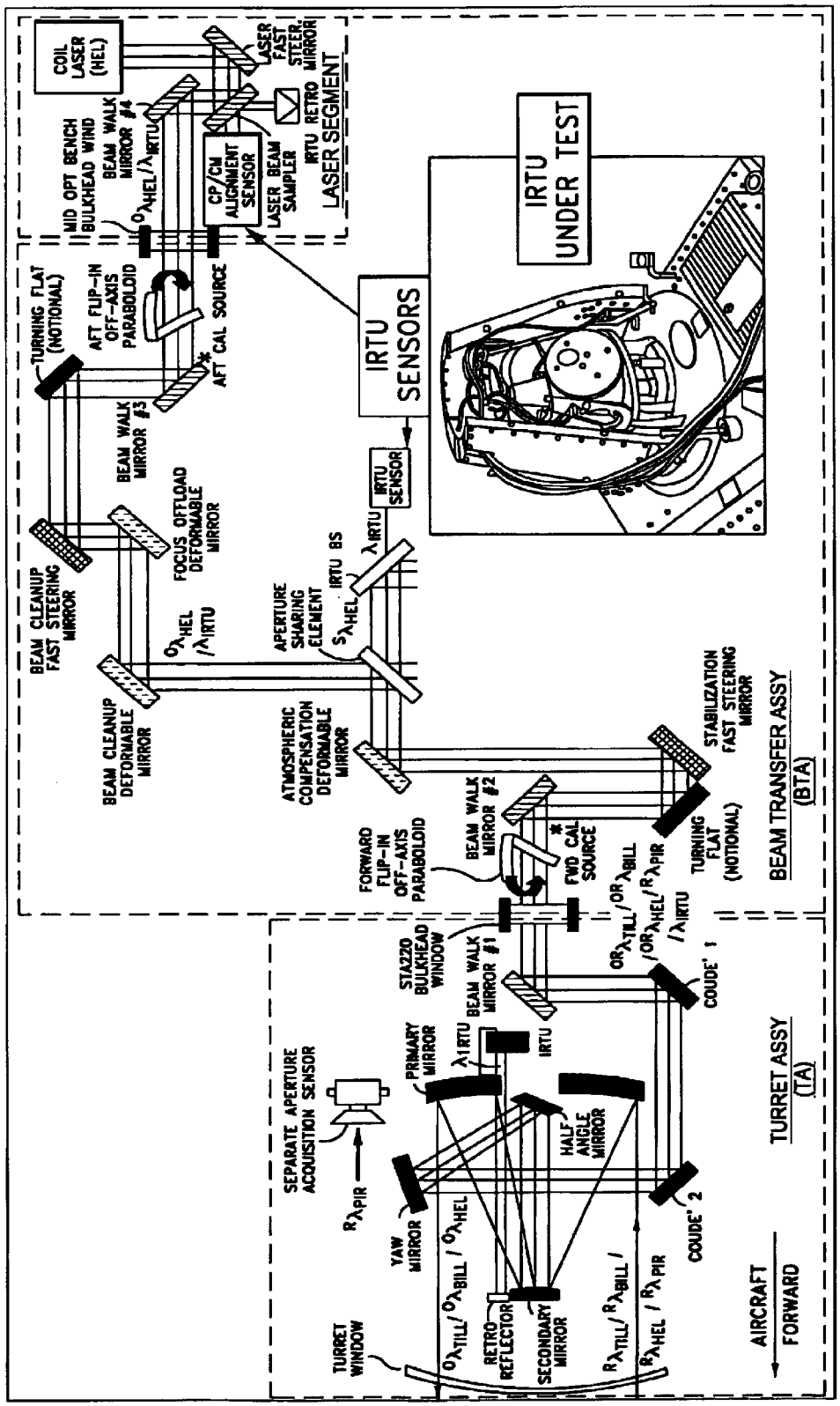
FIG. 10 illustrates a simplified optical path for alignment mode of laser system.
Figure 11:
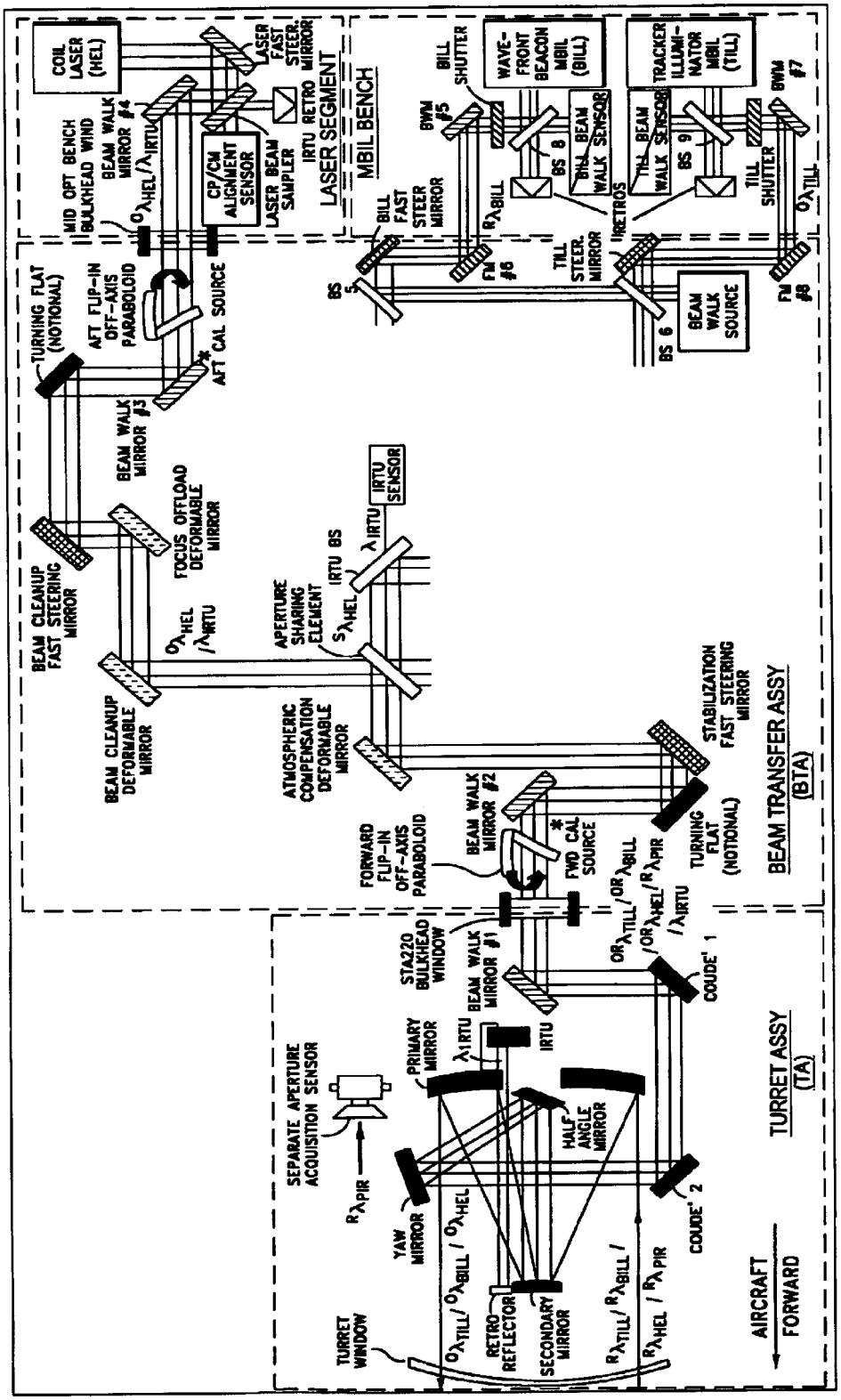
FIG. 11 illustrates a simplified optical path for normal operation mode of laser system.

FIGS. 10 and 11 show simplified optical paths for alignment mode and normal operation mode respectively. This diagram is merely an example, which should not unduly limit the scope of the claims. One of ordinary skill in the art would recognize many variations, alternatives, and modifications. In normal operation mode, laser system 900 sends out laser beams and receives return signals. In creating the database for compensating for turbulences, system 900 actively maintains correction of system 910 of COIL HEL.

During engagement, the laser system may use settings and times in the database to correct for optical distortions according to an embodiment of the present invention. For example, the laser system includes a laser source, an optical system coupled to the laser source, and a database system coupled to the optical system and the laser source. The database system stores correction settings and their corresponding correction times. The correction settings can correct for potential distortions in the optical system at respective correction times. The correction times measure operation periods of the laser system since the last cooling period. Additionally, the laser system can retrieve a stored correction setting and its corresponding correction time. During engagement of the laser system and the laser target, the laser system can adjust based on the retrieved correction setting at the first correction time. The above description is only an example and should not unduly limit the scope of the claims. One of ordinary skill in the art would recognize many variations, alternatives, and modifications.

The present invention possess numerous advantages. For example, during actual engagement, the present invention frees the beacon laser beam of the laser system for other use. The beacon laser beam may be used in place of the track laser beam except during short-duration update process, and consequently the track laser beam may be used for other purpose. Therefore, the present invention reduces use of either the beacon laser beam system or track laser beam system, their cooling systems, and their diode pump lasers, and elongates the service lives of both systems. In addition, the present invention improves compensation for turbulences. In the present invention, the database is created in the absence of actual engagement; therefore, the laser system can be set to precisely remove the focus of the return signal resulting from backscattering of the beacon laser beam. In contrast, the conventional technique usually performs estimation of turbulences during actual engagement. Hence the laser system is usually set to focus the high energy laser beam to the distant laser target but cannot precisely remove the focus of the return signal resulting from backscattering of the beacon laser beam. Moreover, the present invention improves the signal to noise ratio of the wavefront sensor. In the present invention, the beacon laser beam may be focused to a focal point near the laser system, such as about 7.5 kilometers above the laser system. Hence the beacon laser system travels through altitudes at which the atmospheric density is high so that the backscattered signal remains strong.

It is understood the examples and embodiments described herein are for illustrative purposes only and that various modifications or changes in light thereof will be suggested to persons skilled in the art and are to be included within the spirit and purview of this application and scope of the appended claims.

What is claimed is:

1. A method for processing optical signals to correct for optical distortions, the method comprising:
   providing a laser system, the laser system including at least an energy source and an optical system, the optical system being configured to direct an energy beam from the energy source to a target object;
   maintaining the laser system in a first measurement condition;
   orienting a first measurement laser beam at a first measurement angle;
   sending the first measurement laser beam to a first measurement focal point at a first measurement time;
   receiving a first measurement return signal in response to the first measurement laser beam;
   adjusting the laser system to a first measurement setting in response to the first measurement return signal;
   storing the first measurement setting and the first measurement time;
   determining whether to send a second measurement laser beam to a second measurement focal point at a second measurement time; and
   wherein the providing, the maintaining, the orienting, the sending, the receiving, the adjusting, the storing, and the determining are performed free from an engagement between the laser system and a laser target.

2. The method of claim 1 wherein the providing, the maintaining, the orienting, the sending, the receiving, the adjusting, the storing, and the determining are free from presence of a laser target.

3. The method of claim 1, the method further comprising
compiling the first measurement setting and the first measurement time into a database, the database comprising measurement settings of the laser system and their corresponding measurement times.

4. The method of claim 3 wherein the database is a lookup table.

5. The method of claim 1, the method further comprising
maintaining the laser system in a second measurement condition;
orienting the second measurement laser beam at a second measurement angle;
sending the second measurement laser beam to the second measurement focal point at the second measurement time;
receiving a second measurement return signal in response to the second measurement laser beam;
adjusting the laser system to a second measurement setting in response to the second measurement return signal;
storing the second measurement setting and the second measurement time;
determining whether to send a third measurement laser beam to a third measurement focal point at a third measurement time.

6. The method of claim 5, the method further comprising
compiling the first measurement setting, the first measurement time, the second measurement setting, and the second measurement time into a database, the database comprising measurement times and their corresponding measurement settings of the laser system.

7. The method of claim 6, wherein the database is a lookup table.

8. The method of claim 6, the method further comprising:
obtaining a first intermediate setting of the laser system at a first intermediate time using the first measurement setting, the first measurement time, the second measurement setting, and the second measurement time.

9. The method of claim 8, wherein the obtaining a first intermediate setting comprising:
determining a first intermediate setting using interpolation of the first measurement setting and the second measurement setting.

10. The method of claim 8, the method further comprising:
compiling the first intermediate setting and the first intermediate time into the database.

11. The method of claim 3, wherein the measurement times and the measurement settings are provided to adjust the laser system during the engagement of the laser system and the laser target.

12. The method of claim 11, wherein during the engagement, the direction from the laser system to the laser target is substantially vertical to the sea level.

13. The method of claim 12, wherein the angle between the direction from the laser system to the laser target and the direction vertical to the sea level ranges from 0 degree to 40 degrees.

14. The method of claim 1, the method further comprising
performing a first update of the database.

15. The method of claim 14, wherein the first update comprising:
maintaining the laser system to a first update condition;
orienting a first update laser beam at a first update angle;
sending the first update laser beam to the first update focal point at a first update time;
receiving a first update return signal in response to the first update laser beam;
adjusting the laser system to a first update setting in response to the first update return signal;
updating the database using the first update setting and the first update time.

16. The method of claim 15, wherein the first update is performed immediately before the engagement.

17. The method of claim 15, wherein the first update is performed during the engagement.

18. A method for predicting optical distortions, the method comprising:
sending a first measurement laser beam to a first measurement focal point at a first measurement time;
receiving a first measurement return signal in response to the first measurement laser beam;
adjusting a laser system to a first measurement setting in response to the first measurement return signal;
wherein the sending, the receiving, and the adjusting are free from an engagement between the laser system and a laser target.

19. The method of claim 18, the method further comprising:
sending a second measurement laser beam to a second measurement focal point at a second measurement time;
receiving a second measurement return signal in response to the second measurement laser beam;
adjusting the laser system to a second measurement setting in response to the second measurement return signal;
wherein the sending a second measurement laser beam, the receiving the second measurement return signal, and the adjusting the laser system to a second measurement setting are free from an engagement between the laser system and a laser target.

20. The method of claim 19, the method further comprising:
storing the first measurement setting and the first measurement time into a database;
storing the second measurement setting and the second measurement time into the database.

21. The method of claim 20, the method further comprising:
performing a first update of the database to create the updated database.

22. The method of claim 21, wherein the updated database is provided to adjust the laser system.

23. The method of claim 21, the method further comprising:
obtaining a first intermediate setting of the laser system at a first intermediate time using the updated database;
wherein the intermediate time is between the first measurement time and the second measurement time;
wherein the obtaining a first intermediate setting is free from sending a measurement laser beam, sending a update laser beam, and adjusting the laser system.

24. The method of claim 23, wherein obtaining a first intermediate settings of the laser system is free from an engagement between the laser system and a laser target.

25. The method of claim 23, wherein obtaining a first intermediate settings of the laser system is performed during an engagement between the laser system and a laser target.

26. The method of claim 23, wherein the intermediate time and the intermediate setting are stored into the database.

27. The method of claim 23, wherein the intermediate time and the intermediate setting are provided to adjust the laser system during an engagement between the laser system and a laser target.

28. A system for processing optical signals to correct for optical distortions, the system comprising:

a laser system;

a carrier system carrying at least the laser system;

a control system interacting with at least the laser system; and a memory system interacting with at least the control system;

wherein the carrier system is configured to maintain the laser system to a first measurement condition;

wherein the laser system is configured to:

orient a first measurement laser beam at a first measurement angle;

send the first measurement laser beam to a first measurement focal point at a first measurement time;

receive a first measurement return signal in response to the first measurement laser beam;

adjust to a first measurement setting in response to the first measurement return signal;

wherein the control system is configured to determine whether to send a second measurement laser beam to a second measurement focal point at a second measurement time;

communicate the determination to the laser system;

wherein the memory system is configured to store at least the first measurement setting and the first measurement time.

29. The system of claim 28, wherein the processes to orient, to send, to receive, and to adjust are performed free from an engagement of the laser system and a laser target.

30. The system of claim 29, wherein the processes to orient, to send, to receive, and to adjust are performed free from presence of a laser target.

31. The system of claim 29, wherein the laser system is further configured to:

during the engagement of the laser system and a laser target, adjust in response to the first measurement setting and the first measurement time.

32. The system of claim 29, wherein the laser system comprising:

a system of chemical oxygen iodine high energy laser;

a system of multibeam illuminator bench;

a system of beam transfer assembly; and a system of turret assembly.

* * * * *

UNITED STATES PATENT AND TRADEMARK OFFICE
CERTIFICATE OF CORRECTION

PATENT NO.        : 7,002,127 B2
APPLICATION NO.   : 10/611802
DATED             : February 21, 2006
INVENTOR(S)       : Kenneth W. Billman It is certified that error appears in the above-identified patent and that said Letters Patent is hereby corrected as shown below:

ON THE TITLE PAGE:

The assignee information is missing from the cover page. Accordingly, the following should be inserted --Item [73] Assignee: Lockheed Martin Corporation, Bethesda, MD--.

Signed and Sealed this

Seventh Day of November, 2006

JON W. DUDAS
*Director of the United States Patent and Trademark Office*